Feb. 4, 1964
L. L. GENUIT
3,120,633
SERIES INVERTER CIRCUIT HAVING CONTROLLED
RECTIFIERS WITH POWER DIODES IN
REVERSE PARALLEL CONNECTION
Filed Feb. 1, 1960
2 Sheets-Sheet 1
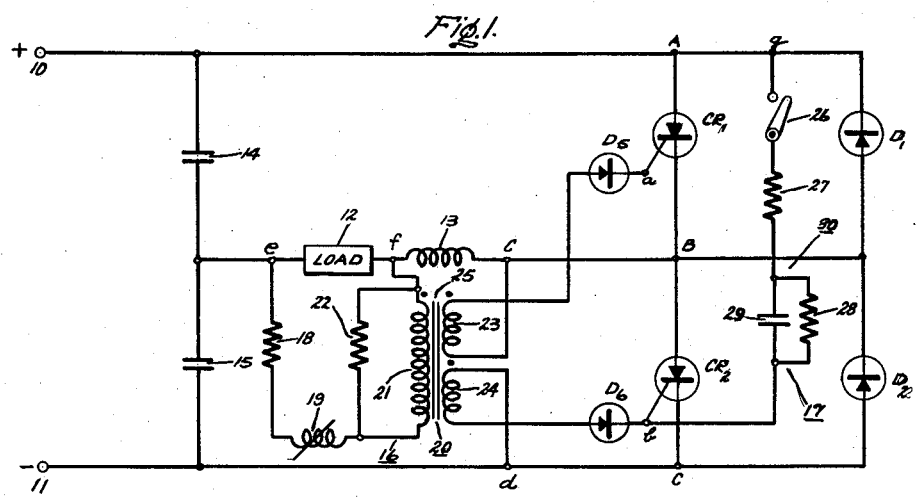
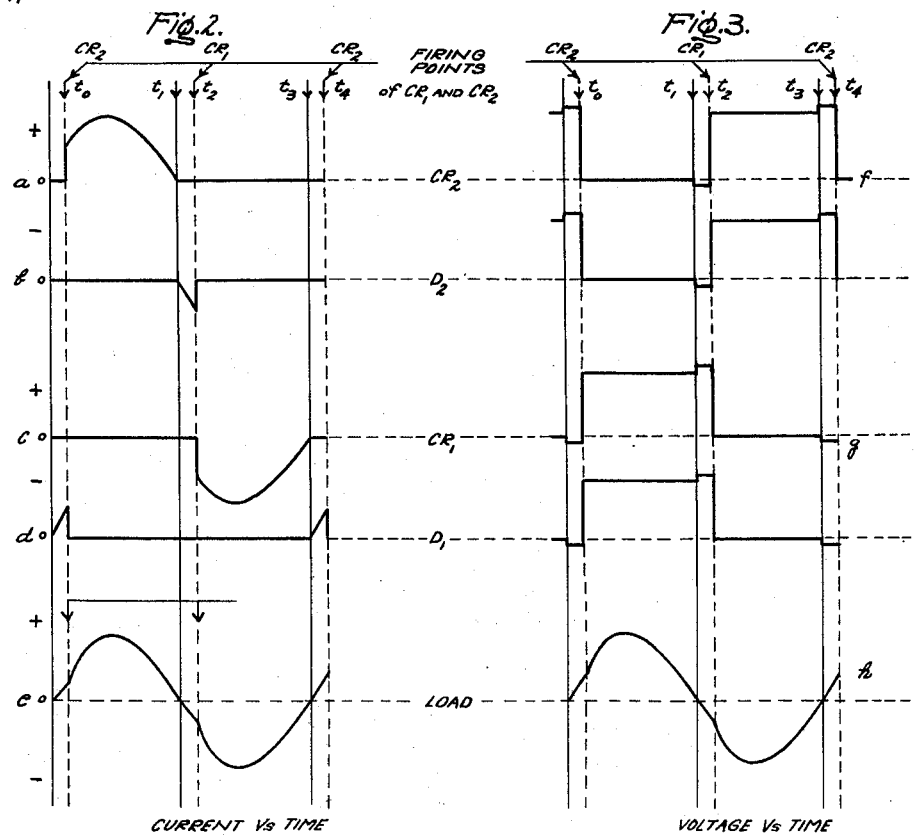
Inventor:
Luther L. Genuit,
by Henry J. Maciniak
Attorney.

Feb. 4, 1964     L. L. GENUIT     3,120,633
SERIES INVERTER CIRCUIT HAVING CONTROLLED
RECTIFIERS WITH POWER DIODES IN
REVERSE PARALLEL CONNECTION
Filed Feb. 1, 1960     2 Sheets-Sheet 2
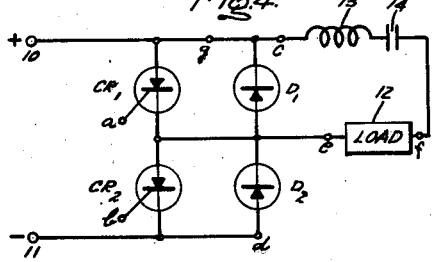
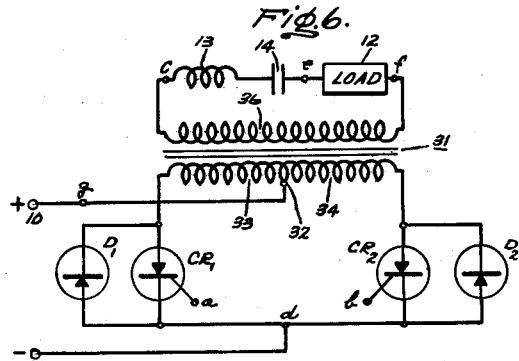
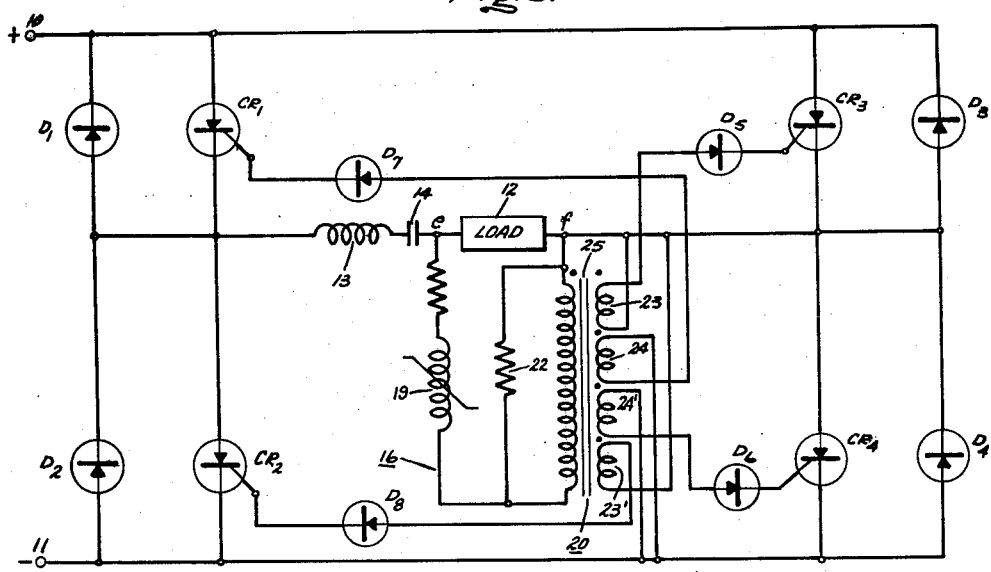
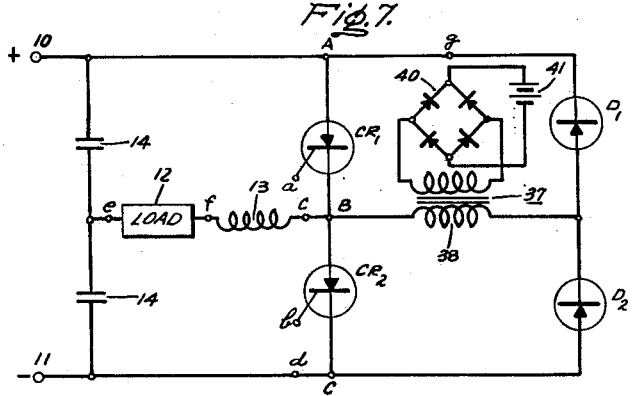
Inventor:
Luther L. Genuit,
by Henry J. ———
Attorney.

United States Patent Office 3,120,633
Patented Feb. 4, 1964

3,120,633
SERIES INVERTER CIRCUIT HAVING CON-
TROLLED RECTIFIERS WITH POWER DI-
ODES IN REVERSE PARALLEL CONNEC-
TION
Luther L. Genuit, Danville, Ill., assignor to General
Electric Company, a corporation of New York
Filed Feb. 1, 1960, Ser. No. 5,847
13 Claims. (Cl. 321—45)

This invention relates to semiconductive controlled rectifier inverter circuits for converting direct current into alternating current and is more particularly concened with series inverter circuits in which the effects of the inverse voltage on the circuit during commutation of the controlled rectifiers is minimized.

Inverter circuits employing semiconductive devices are finding increasing use as a convenient means for obtaining alternating current from a direct current power supply or to step up the voltage of the direct current power supply. An inverter circuit employing semiconductive controlled rectifiers having a firing circuit energized by the inverse voltage occurring during commutation is described and claimed in my copending application entitled "Controlled Rectifier Inverter Circuits" and assigned to the same assignee as the present invention. Although under proper operating conditions applications of this inverter circuit as a means for converting direct current into alternating current have proven to be successful, the circuit has certain inherent limitations. In inverter circuits of this type, the inverter output voltage is at zero during the commutation period that occurs each half cycle. At frequencies of above 3,000 cycles, the gaps in the current supply are objectionable because the gaps take up a relatively large portion of each half cycle.

In the inverter circuits to which the present invention is applicable, the load circuit has associated with it an inductance, a resistance and capacitance whereby it functions as an oscillatory circuit and causes the waveform of the load current to be in shape of a damped sinusoid. The polarity reversal resulting from the damped oscillation provides the inverse voltage required for a conducting controlled rectifier to revert to a blocking state at the completion of its operating cycle. However, in inverter circuits where the voltages for driving the firing circuits are derived from the commutation voltage, the circuit has to be derated in order that the controlled rectifiers can be protected against breakdown due to the voltage overshoots which occur during the commutation. A controlled rectifier is limited by the continuous peak voltage which it will withstantd in both the forward and reverse directions without breaking down. In any given application, if the voltage rating of the controlled rectifier is exceeded sufficiently in the forward direction, it will fire even though no gate signal is present. In a series inverter circuit employing two controlled rectifiers, this may result in both of the controlled rectifiers conducting simultaneously. If the voltages are exceeded in the reverse direction, the controlled rectifier may go into an avalanche breakdown and destroy itself. Thus, it will be seen that the voltage rating of the controlled rectifier imposes a severe limitation on inverter circuits which derive their firing voltages from the commutation voltages. It is therefore desirable that the effects of any voltage overshoots during the commutation period of the rectifiers be minimized so that the operating voltage level of the circuit can be safely increased.

Another limiting factor on the rating utilization of a controlled rectifier in an inverter circuit is the effect of the load circuit quality (circuit quality denoting the ratio of inductance to the effective resistance of the load circuit) on the operating voltages in the circuit. In inverter circuits in which no provision is made for the limitation of the voltage overshoots during commutation, the operation of the circuit may be adversely affected by high load circuit quality since these voltages vary with the circuit quality. Thus, in order that an inverter circuit be operated with a load circuit having a relatively high quality, it is necessary that the operating voltage levels of the inverter circuits not be affected by variations in the load circuit quality.

A general object of the invention is to provide an improved semiconductive controlled rectifier inverter circuit for producing alternating current from a direct current supply.

It is a more specific object of the invention to provide an improved semiconductive controlled rectifier inverter circuit in which the voltage overshoot during commutation of the controlled rectifiers is limited in order to make it possible to more efficiently utilize the ratings of the controlled rectifiers.

Another object of the invention is to provide an improved semiconductive controlled rectifier inverter circuit which produces an alternating current without objectionable gaps in the instantaneous current output at frequencies above 3,000 cycles.

It is still a further object of the present invention to provide an improved controlled rectifier inverter circuit in which the voltage overshoot during commutation is independent of load circuit quality thereby making it possible to operate the inverter circuit into a load circuit having a wider range of circuit quality values.

These and other objects and advantages of the present invention are achieved by a series inverter circuit in which at least one capacitor is alternately charged and discharged through a load circuit by the current path provided through a pair of controlled rectifiers, which are alternately fired, and by the current path provided by a pair of power diodes when the controlled rectifiers are not conducting. A conducting controlled rectifier is turned off by the reversal of current caused by the oscillatory nature of the load circuit.

In accordance with the invention, a power diode is provided in reverse parallel connection with each controlled rectifier. The power diode carries the inverter current during the commutation period of the controlled rectifiers and limits the voltage overshoot during the commutation period to the low forward voltage drop of the power diode.

In another aspect of the invention, power diodes connected in reverse parallel connection with the controlled rectifiers are employed in a circuit configuration in which a commutation voltage of a fixed magnitude other than zero is maintained during the time the power diodes bypass the current. Such a circuit configuration may be used in conjunction with firing circuits of the type that are excited by fixed commutation voltage.

The subject matter which I regard as my invention is set forth in the appended claims. The invention itself, however, together with further objects and advantages thereof may be understood by referring to the following description taken in connection with the accompanying drawings in which:

FIG. 1 is a schematic circuit diagram of a series inverter circiut in which the invention is embodied;

FIG. 2 illustrates the waveforms of the instantaneous current flow through the controlled rectifiers $CR_1$, $CR_2$, the diodes $D_1$, $D_2$ and the load during one complete cycle of the alternating current supply;

FIG. 3 illustrates the waveforms of the instantaneous voltage across the controlled rectifiers $CR_1$, $CR_2$ the diodes $D_1$, $D_2$ and the load during one complete cycle of the alternating current supply;

FIG. 4 is a schematic circuit diagram showing the basic inverter circuit configuration load in accordance with the present invention employing a single capacitor in which the starting and firing circuits have been omitted, the terminal connections $a$, $b$, $c$, $d$, $e$, $f$ and $g$ of the firing and starting circuits of FIG. 1 being connectable to the circuit of FIG. 4 at corresponding points $a$, $b$, $c$, $d$, $e$, $f$ and $g$;

FIG. 5 is a schematic diagram illustrating another embodiment of the invention in which two pairs of controlled rectifiers $CR_1$, $CR_2$ and $CR_3$, $CR_4$ and two pairs of diodes $D_1$, $D_2$ and $D_3$, $D_4$ are connected in reverse parallel connection;

FIG. 6 illustrates a schematic diagram of an embodiment of the invention in which the starting and firing circuits are omitted, the terminal connections $a$, $b$, $c$, $d$, $e$, $f$ and $g$ of the firing and starting circuit of FIG. 1 being connectable to the circuit of FIG. 6 at corresponding points $a$, $b$, $c$, $d$, $e$, $f$ and $g$; and FIG. 7 is a schematic diagram of another embodiment of the invention in which the firing and starting circuits are not shown, the connections $a$, $b$, $c$, $d$, $e$, $f$ and $g$ of the firing and starting circuits shown in FIG. 1 being connectable in the circuit of FIG. 7 at corresponding points $a$, $b$, $c$, $d$, $e$, $f$ and $g$.

In the inverter circuits illustrated in the drawings like reference numerals and letters designate corresponding elements in the FIGS. 1, 4, 5, 6 and 7. Referring to FIG. 1, a pair of input terminals or conductors 10, 11 are provided for the purpose of connecting the inverter circuit to a suitable direct current power source (not shown) in the polarity indicated, the positive terminal indicating the high potential side, the negative terminal indicating the negative or grounded side and the current being assumed to flow from the positive to the negative side.

The semiconductive controlled rectifiers $CR_1$, $CR_2$ generally designated by the letters CR with a numeral subscript may be any suitable type of controlled rectifier having an adequate current carrying capacity for a particular inverter circuit design. In the preferred embodiment of this invention, silicon controlled rectifiers are used because of their high current carrying capacity. As shown schematically in the drawings, the anode is represented by the arrow, the cathode by the transverse bar and the gate or control electrode by the oblique connection.

In the series inverter circuits of the invention, the controlled rectifiers $CR_1$, $CR_2$, $CR_3$, $CR_4$ are PNP junction semiconductors and can be switched into a high conduction state at an anode-to-cathode voltage less than the breakover by supplying a low level gate-to-cathode current. This characteristic of the controlled rectifier makes it possible to use them to control a substantially large current flow by a low power signal supplied to the gate electrode.

The power diodes $D_1$, $D_2$, $D_3$, $D_4$ used in the inverter circuits according to the present invention are designated generally by the letter D with appropriate numeral subscripts. Since the power diodes $D_1$, $D_2$, $D_3$, $D_4$ carry the load current during the commutation period of the controlled rectifiers, the current rating of the power diodes $D_1$, $D_2$, $D_3$, $D_4$ to be selected will depend on the root mean square current that the power diodes $D_1$, $D_2$, $D_3$, $D_4$ carry. In a given circuit, the value of the root mean square current through the power diodes $D_1$, $D_2$, $D_3$, $D_4$ will depend, among other factors, upon the duration of the commutation period of the controlled rectifier used and the frequency of the inverter circuit output. For the silicon controlled rectifiers $CR_1$, $CR_2$, $CR_3$, $CR_4$ used in the hereinafter described exemplifications of the invention, it is preferable that the commutation period be no less than 20 microseconds. Thus, it will be appreciated that the root mean square current through a power diode in an inverter circuit having a commutation period of 20 microseconds and an output frequency of 10,000 cycles will be substantially greater than the current in the power diode of an inverter circuit having a 12 microsecond commutation period at a frequency of, for example, 400 cycles.

In the preferred embodiment of the invention, an alloy junction silicon rectifier was used for power diodes $D_1$, $D_2$, $D_3$, $D_4$. It will be understood that other power diodes or rectifiers can be used depending on the operating conditions to be experienced in a particular inverter circuit. As shown symbolically in the drawings, the arrow represents the anode, and the transverse bar the cathode of the power diodes $D_1$, $D_2$, $D_3$, $D_4$.

The load 12 is shown schematically in the drawings as a rectangle, which is connected in circuit with a pair of output terminal connections $a$, $b$. An inductor 13 is shown connected in all of the circuit diagrams in series circuit relationship with the load 12. It will be appreciated that the inductance provided by the inductor 13 may not be required or it may be eliminated in part if the overall reactance of the load 12 is inductive. The series combination of the resistance of the load 12, the inductance of the inductor 13 and the capacitance provided by capacitors 14, 15 of FIGS. 1 and 7 and the capacitor 14 of FIGS. 4, 5 and 6 form an oscillatory circuit.

At point A the anode of the controlled rectifier $CR_1$ is connected in circuit with the positive input terminal 10. The cathode of controlled rectifier $CR_1$ and the anode of the controlled rectifier $CR_2$ are connected at point B. At point C the cathode of controlled rectifier $CR_2$ is connected in circuit with the negative input terminal 11.

In the inverter circuit illustrated in FIG. 1 a pair of serially connected capacitors 14, 15 are connected across the direct current input terminals 10, 11. It will be appreciated that the inverter circuit in accordance with the present invention can be operated with only one capacitor 14, as shown in the embodiments of the invention illustrated in FIGS. 4, 5 and 6. For the same power delivered to the load, when a single capacitor is used in the inverter circuit, the current pulses drawn from the direct current source are twice as large and occur half as often. In such inverter circuits, the capacitor must therefore have twice the capacitance of a capacitor employed in the circuit shown in FIG. 1. Since the peak value of the pulses drawn from the direct current source is doubled in an inverter circuit employing one capacitor, a more stringent demand is thereby imposed on the power source, and it is therefore preferable that two capacitors be employed.

Controlled rectifiers $CR_1$, $CR_2$ are triggered by a firing circuit 16 which, as shown in FIG. 1, is connected in the inverter circuit at the terminal connections $a$, $b$, $c$, $d$, $e$ and $f$. It will be noted that in FIGS. 4, 6 and 7 the firing circuit has been omitted in the interest of simplification. The firing circuit 16 of FIG. 1 can be used to trigger the controlled rectifiers $CR_1$, $CR_2$ of the inverter circuits illustrated in FIGS. 4, 6 and 7 by connecting the firing circuit of FIG. 1 at the corresponding points $a$, $b$, $c$, $d$, $e$ and $f$ of the inverter circuits shown in FIGS. 4, 6 and 7. With additional windings 23' and 24 on the transformer 20 and the two diodes $D_7$, $D_8$, connected as shown in FIG. 5, the firing circuit of FIG. 1 can be adapted to the inverter circuit illustrated in FIG. 5.

The firing circuit 16 includes a first resistor 18, a nonlinear reactor 19 connected in series circuit relationship with the transformer 20 having a magnetic core 25, a primary winding 21 and two secondary windings 23, 24 and a second resistor 22 connected across the primary winding 21. The transformer 20 provides direct current isolation of the firing circuit 16 and alternating current coupling with the gate electrodes of the controlled rectifiers $CR_1$, $CR_2$. The amount of current admitted to the firing circuit 16 may be adjusted by the selection of a suitable value of resistance for the resistor 18. The purpose of the nonlinear reactor 19 is to provide a predetermined delay after a polarity reversal occurs at the terminal connections $e$, $f$ and before this polarity reversal appears across the primary winding 21.

It will be noted that the secondary winding 23 is connected in circuit with the gate electrode of controlled rectifier $CR_1$ and wound on the magnetic core 25 so that when a current flows out of the lower end of the primary winding 21 a current pulse is induced in the secondary winding 23 which fires the controlled rectifier $CR_1$. The secondary winding 24 is connected in circuit with the gate electrode of the controlled rectifier $CR_2$ and wound on the magnetic core 25 so that when current flow is out of the upper end of the primary winding 21 a current pulse is induced in the secondary winding 24 which fires the controlled rectifier $CR_2$.

Although a particular firing circuit 16 is shown to illustrate the operation of the inverter circuit according to the invention, it will be apparent that other firing circuits can be utilized to trigger the controlled rectifiers $CR_1$, $CR_2$. Another example of another firing circuit which can be utilized is described in FIG. 2 of my copending application entitled "Controlled Rectifier Inverter Circuits" and assigned to the same assignee as the present invention. Accordingly, it is not intended to limit the practice of the present invention to any particular firing circuit configuration.

The diodes $D_5$, $D_6$, $D_7$, $D_8$ are provided in the gate circuits of the controlled rectifiers to prevent inverse voltage from being applied from gate-to-cathode during alternate half cycles.

In the inverter circuit of FIG. 1, the starting circuit 17 is shown connected in the inverter circuit at terminal connections $b$, $g$. The starting circuit 17 has been omitted from the inverter circuits illustrated in FIGS. 4, 5, 6 and 7.

It will be apparent that the starting circuit 17 of FIG. 1 may be connected in the inverter circuits shown in FIGS. 4, 6 and 7 at the corresponding points $b$, $g$. Other starting circuit means, which are well known in the art, may be utilized to provide the initial firing pulse to trigger one of the controlled rectifiers $CR_1$, $CR_2$ in order to start the oscillations in the circuit.

The starting circuit 17 is comprised of a single throw switch 26, a resistor 27 and a parallel network 30 including a resistor 28 and a capacitor 29. The amount of the current flow to the gate during the starting condition is adjusted by selecting a suitable value for the resistance of the resistor 27. The capacitor 29 in combination with resistor 27 provides a starting current pulse at the gate of controlled rectifier $CR_2$ at the instant switch 26 is closed. Resistor 28 serves to drain off the accumulated charge from capacitor 29 when switch 26 is opened, thereby "resetting" the starting circuit for another operation. Resistor 28 is chosen sufficiently large to limit the steady state leakage current through the starting circuit to a value well below the current level required for triggering the controlled rectifier.

The operation of the inverter circuit shown in FIG. 1 will now be described. To energize the circuit the input terminals 10, 11 are connected with a direct current power source in the polarity indicated and the load capacitors 14, 15 are charged. To initiate operation of the circuit the starting switch 26 is closed and a pulse of current is provided at the gate electrode of controlled rectifier $CR_2$, thereby firing it. Assuming the starting switch is closed at time $t_0$ indicated in FIG. 2, controlled rectifier $CR_2$ begins conduction at time $t_0$ as shown in FIG. 2, curve $a$. For the first half cycle after starting, however, the current must build up from zero at time $t_0$ rather than from the initial finite value shown. When controlled rectifier $CR_2$ is in a conducting state, it provides a path for the discharge current of the capacitors 14, 15 through the load 12, the inductor 13, point B and the controlled rectifier $CR_2$ to the negative or grounded side 11 of the inverter circuit. This main discharge current flow constitutes a portion of the first half cycle of the alternating current supplied at the terminals $e$, $f$.

As shown in curve $a$ of FIG. 2, the main current flow through the load 12 is in the shape of a damped sinusoid because of the oscillatory nature of the load circuit comprising the capacitors 14, 15, the resistive portion of load 12 and the inductor 13. As this instantaneous current flow through the controlled rectifier $CR_2$ reaches the zero point and attempts to build up in the reverse direction, it is blocked from $CR_2$ by the reverse blocking characteristic of $CR_2$, and passes instead through diode $D_2$ in the direction of the arrow representing the anode of $D_2$. Point C now becomes positive with respect to point B by a voltage equal to the forward voltage drop of diode $D_2$, and controlled rectifier $CR_2$ enters its commutation period.

As shown in curve $h$ of FIG. 3, at time $t_1$, the beginning of the commutation period of controlled rectifier $CR_2$, a reversal of the polarity of the voltage across the load 12 takes place. After a fixed delay, a reversal of polarity also occurs across the primary winding 21 of transformer 20, thereby supplying a delayed firing pulse in the secondary winding 23 which is supplied to the gate electrode of controlled rectifier $CR_1$ and triggers it at time $t_2$. It will be seen from curve $c$ of FIG. 2 that the load current during the period following $t_2$ is carried by the controlled rectifier $CR_1$, and power diode $D_2$ again reverts to a blocking state. It will be appreciated that if it were not for the power diode $D_2$ conducting the current during the commutation period of controlled rectifier $CR_2$, a sharp voltage overshoot or commutation voltage would occur across the controlled rectifier $CR_2$. At the same time, if it were not for the power diode $D_2$, there would be a corresponding rise in the forward voltage appearing across controlled rectifier $CR_1$. It will be noted that the step increase in forward voltage experienced by one controlled rectifier is equal in magnitude to the reverse commutation voltage occurring simultaneously across the other controlled rectifier.

Referring now to curve $f$ of FIG. 3, it will be seen that at the end of its conducting period the voltage overshoot or commutation voltage of controlled rectifier $CR_2$ is nominal and is limited to the low forward voltage drop of power diode $D_2$. Without the diodes $D_1$, $D_2$ in reverse parallel connection, there would be a gap in the load current at the end of each half cycle, since the current during the commutation period would be at the zero level. Thus, in accordance with the present invention, the inverter circuit supplies a load current, as illustrated by curve $e$ of FIG. 2, that has a substantially sinusoidal waveform without discontinuities because the diodes $D_1$, $D_2$ carry the load current during commutation. This arrangement makes it practicable to operate the inverter circuit at relatively high frequencies which for some applications heretofore were not practical in circuits of this type because of the gaps in the current supply.

As shown in curve $c$ of FIG. 2, controlled rectifier $CR_1$ carries the load current after it has been triggered at time $t_2$ and diode $D_2$ reverts to a blocking state. The main current flow in the inverter circuit of FIG. 1 now follows a path defined by the positive terminal 10, point A, controlled rectifier $CR_1$, point B, the inductor 13, the load 12 and capacitor 14 back to terminal 10. During this same period, energy is supplied to the circuit by the direct current supply in the form of a charging current flowing from terminal 10 through capacitor 14, capacitor 15 and back into the direct current supply through terminal 11. The magnitude of this charging current is instantaneously equal to one half the value of the load current. This charging current maintains the instantaneous algebraic sum of the voltages across capacitors 14 and 15 equal to the direct current supply voltage. During this portion of the half cycle, the current waveform, as illustrated by curve $c$ of FIG. 2, has the shape of a damped sinusoid because of the oscillatory nature of the load portion of the circuit. At the end of the second half cycle when the current again reaches the zero level, the current reverses and begins to build up as a continuation of the same damped sine wave. This reverse current, however, is blocked by the reverse blocking characteristic of controlled rectifier $CR_1$ and passes instead through diode $D_1$, completing the circuit about the path defined by capacitor 14, load 12 and inductor 13. During this period, energy is returned to the direct current supply by means of a reverse charging current flowing out of terminal 11 through capacitors 15 and 14 to terminal 10 and again equal instantaneously to one half the magnitude of the load current. The reversal of the load current just described initiates the commutation period of controlled rectifier $CR_1$ and another half cycle of events begins. As the current passes through zero, the polarity of the voltage across the load 12 reverses. Since the firing circuit 16 is connected across the load 12, after a fixed delay this reversal of polarity is impressed across the primary 21 of transformer 20 and a current pulse is induced in the secondary winding 24 which fires controlled rectifier $CR_2$ at time $t_4$. Time $t_4$ corresponds to time $t_0$ in FIGS. 2 and 3, and the cycle of events repeats as described above.

It will be understood that the forward and reverse blocking voltage ratings of the controlled rectifier are approximately equal and that in a series-commutated inverter circuit, in which the commutation voltage is not limited, the peak reverse voltage experienced by the controlled rectifier is the commutation voltage. Thus, the peak forward voltage experienced by the same controlled rectifier is equal to the commutation voltage plus the direct current supply voltage. Commutation voltages equal to or greater than the magnitude of the direct current supply voltage are not unusual in inverters of this type. Therefore, it is seen that in such circuits the maximum permissible direct current supply voltage that may be employed is often less than one half the voltage rating of the controlled rectifier. This results in a very inefficient utilization of the controlled rectifier volt-ampere rating. It also requires that limits be maintained on the load circuit quality because an increase in this characteristic (either transient or steady-state) results in an increased commutation voltage.

Since in the inverter circuits of this invention the commutation voltage is limited either to the low forward drop of the by-pass diodes $D_1$, $D_2$ or to some higher fixed level, the improved inverter may be operated at a direct current supply voltage only slightly below the voltage rating of the controlled rectifier with no regard for level or variation in level of load circuit quality. This represents a very significant economic advantage because it permits the full utilization of the volt-ampere rating of the controlled rectifiers which are the most expensive components in the inverter.

In the circuit shown in FIG. 4 a single load capacitor 14 is used. The load capacitor 14 is serially connected with the inductor 13 and the load 12. As in the circuit of FIG. 1, the controlled rectifiers $CR_1$, $CR_2$ and the power diodes $D_1$, $D_2$ are also serially connected across the input terminals 10, 11. It will be noted that the firing and starting circuit details have been omitted. However, the firing and starting circuits of FIG. 1 may be used by connecting terminal connections $a$, $b$, $c$, $d$, $e$, $f$ and $g$ at the corresponding points of FIG. 4.

Essentially, the operation of the circuits of FIGS. 1 and 4 are the same. During the first half cycle the path of current flow in the inverter circuit shown in FIG. 4 is from the positive terminal 10, through the inductor 13, the capacitor 14, the load 12, and controlled rectifier $CR_2$ to the negative input terminal 11. At the end of the first half cycle when the current reverses and the controlled rectifier $CR_2$ enters its commutation period, the power diode $D_2$ carries the load current. The current flow is now from the negative input terminal 11 through diode $D_2$, the load 12, the capacitor 14 and the inductor 13 to the positive terminal or conductor 10. Controlled rectifier $CR_1$ is fired at the end of the commutation period of controlled rectifier $CR_2$.

When controlled rectifier $CR_1$ is in a conducting state, the capacitor 14 is discharged, and the path of current flow is from the capacitor 14 through the inductor 13, the controlled rectifier $CR_1$, the load 12 and to the capacitor 14. The current flow continues through this loop until the current flow is reversed due to the oscillatory nature of the network comprising the inductor 13, capacitor 14 and load circuit 12. During this period, which is the commutation period of controlled rectifier $CR_1$, current flows through load 12, upward through diode $D_1$, through inductor 13 and back into capacitor 14'. A principal advantage of the circuit configuration of FIG. 4 is that it requires only a single load capacitor 14.

FIG. 5 illustrates an embodiment of the present invention in which two pairs of power diodes $D_1$, $D_2$ and $D_3$, $D_5$ and two pairs of controlled rectifiers $CR_1$, $CR_2$ and $CR_3$, $CR_4$ are employed in a bridged arrangement. The purpose of using the bridged arrangement is to double the power output of a given series inverter circuit in accordance with the present invention for a given rating of a controlled rectifier.

For the sake of simplification, the firing and starting circuits in FIG. 5 have been omitted. Having reference now to current and voltage curves of FIGS. 2 and 3, it will be seen that the controlled rectifiers $CR_1$, $CR_4$ are fired simultaneously, at a point $t_2$ during one half cycle of the main current, and the controlled rectifiers $CR_2$, $CR_3$ are fired at a point $t_0$ or $t_4$ during the other half cycle.

The operation of the inverter circuit shown in FIG. 5 will now be described. Assuming that the controlled rectifiers $CR_1$, $CR_4$ are in a conducting state, the current from the positive input terminal 10 follows a path through controlled rectifier $CR_1$, the inductor 13, the capacitor 14, the load 12 and controlled rectifier $CR_4$ to the negative input terminal 11. When the current flow reverses initiating the commutation period of controlled rectifiers $CR_1$ and $CR_4$ at the end of this half cycle, the reverse path of current flow through the load circuit is handled by diodes $D_1$ and $D_4$, the path of current flow being from the negative side or terminal 11 through power diode $D_4$, the load 12, capacitor 14, inductor 13 and power diode $D_1$ to the positive side or positive terminal 10. The diodes $D_1$, $D_4$ carry the main current during the commutation period of the controlled rectifiers $CR_1$, $CR_4$. At the end of this commutation period, controlled rectifiers $CR_2$, $CR_3$ are triggered.

With controlled rectifiers $CR_2$ and $CR_3$ in a conducting state, the path of current flow in the inverter circuit is from the positive input terminal 10 through controlled rectifier $CR_3$, the load 12, capacitor 14, inductor 13 and controlled rectifier $CR_2$ to the negative side or input terminal 11. When the current flow reverses its direction due to the oscillatory nature of the load circuit, the controlled rectifiers $CR_2$ and $CR_3$ are turned off and enter their commutation period. The diodes $D_2$ and $D_3$ then carry the load current until controlled rectifiers $CR_1$ and $CR_4$ are again fired. Thus, during the commutation period of controlled rectifiers $CR_2$, $CR_3$ the path of current flow is from the negative side 11 through the power diode $D_2$, the inductor 13, capacitor 14, the load 12 and power diode $D_3$ to the positive side 10 of the direct current supply.

In FIG. 6 an inverter circuit in accordance with the present invention is illustrated in which a center tap transformer 31 is utilized in circuit between controlled rectifiers $CR_1$, $CR_2$ and the power diodes $D_1$, $D_2$ connected in reverse parallel relationship. The positive input terminal or conductor 10 is connected to a center tap 32 of primary windings 33, 34 of the transformer 31. A secondary winding 36 is connected in series circuit relationship with the inductor 13, capacitor 14 and load 12. An end of the primary winding 33 is connected to the anode of controlled rectifier $CR_1$. Similarly, an end of the primary winding 34 is connected to the anode of controlled rectifier $CR_2$. The cathodes of both of the controlled rectifiers $CR_1$, $CR_2$ are connected to a terminal point $d$ to which the negative input terminal or conductor 11 is also joined. The power diode $D_1$ is connected in a reverse parallel relationship with controlled rectifier $CR_1$ and diode $D_2$ is connected in a reverse parallel relationship with diode $D_2$.

The operation of this circuit shown in FIG. 6 is essentially similar to the other illustrated circuits in that diodes $D_1$, $D_2$ carry the load current during the commutation period. During a portion of the half cycle during which controlled rectifier $CR_1$ is in a conducting state, the current from the positive input terminal 10 follows a path through the center tap 32, the primary winding 33, the controlled rectifier $CR_1$ and the junction $d$ to the negative terminal 11. The voltage of the direct current supply is thus impressed across primary winding 33 and is inductively coupled into secondary winding 36. An oscillatory current is thus set up in the secondary circuit and by transformer action in the primary circuit as well.

When controlled rectifier $CR_2$ is in a conducting state, the current flows from the positive input terminal 10 through the center tap 32, the primary winding 34, the controlled rectifier $CR_2$ and through the junction $d$ to the negative input terminal 11. When the current flow in the primary winding 34 reverses because of the oscillatory nature of the load portion of the secondary circuit, controlled rectifier $CR_2$ enters into its commutation period and power diode $D_2$ carries the load current. The path of the current is now from the negative input terminal 11 through the connection point $d$, the primary winding 34 and through the center tap 32 to the positive input terminal 10. At the end of the commutation period of controlled rectifier $CR_2$, the controlled rectifier $CR_1$ is again triggered and controlled rectifier $CR_1$ provides the path for current flow. Similarly, at the end of the commutation period of controlled rectifier $CR_1$, the power diode $D_1$ bypasses the reversed current around controlled rectifier $CR_1$. It will be recognized that this circuit may be rearranged to permit a common anode connection of the controlled rectifiers by reversing the polarity of the direct current supply and by reversing the controlled rectifiers and power diodes. This will be advantageous in some cases as it permits the use of a common heat sink without electrical isolation of controlled rectifiers.

FIG. 7 illustrates an embodiment of the invention which may be utilized in conjunction with controlled rectifiers that may require a finite voltage for commutation or in conjunction with firing circuits to be energized by commutation voltage which require a finite voltage during the commutation period to drive the firing circuits. It will be appreciated that in the inverter circuits as shown in FIGS. 1, 4, 5 and 6 the controlled rectifier voltage during commutation does not exceed the low forward voltage drop of the power diode.

Essentially, the circuit of FIG. 7 has the same general circuit configuration of the inverter circuit shown in FIG. 1 except that a transformer 37 having a primary winding 38 and a secondary winding 39 with a bridge rectifier 40 and an auxiliary power source 41 connected in circuit with the secondary winding 39. The primary winding 38 of the transformer 37 is connected to the point B and to the junction point of the serially connected power diodes $D_1$, $D_2$. The purpose of this circuit modification is to provide an inverter circuit in which the commutation voltage can be preset at a predetermined value.

The inverter circuit shown in FIG. 7 operates as follows: After controlled rectifier $CR_1$ has conducted the current through the load 12 for its portion of a half cycle, it is switched off by the reversal of polarity of point B with respect to point A. A current flows through the primary winding 38 and the diode $D_1$ to the positive input terminal 14. Unless a current flows in the secondary winding 39 of the transformer 37 which is opposite in direction to the current flowing in the primary winding 38, the transformer 37 will present a high impedance to the current flow through the primary winding 38.

In order that a current may flow in the secondary winding 39 of the transformer 37, it is necessary that voltage across winding 39 on the transformer 37 exceeds the voltage of the direct current power source connected across the bridge rectifier 40. When the voltage of the auxiliary source 41 is exceeded, a current flows in the secondary circuit. Thus, the voltage across the transformer will have a substantially square waveform, and its duration will coincide with the duration of the bypass current passing through the diode $D_1$. Further, when the load current is by-passed by power diode $D_1$, a voltage of one polarity appears across the transformer and when the current is by-passed by power diode $D_2$, a voltage of opposite polarity appears across the transformer 37. The finite commutation voltage provided by this circuit modification may be used to drive a firing circuit such as is described in my copending application entitled "Semiconductive Rectifier Inverter Circuits" and assigned to the same assignee as the present invention.

It will be appreciated that a center tap transformer having a center tap of its secondary connected with an auxiliary direct current power source and each end of the secondary connected in series with a rectifier, may be used as an equivalent of the bridge rectifier arrangement shown in FIG. 7. Further, it is to be understood that the inverter circuit shown in FIG. 6 can be readily adapted to provide a finite commutation voltage by connecting in series with each of the diodes $D_1$, $D_2$ a reverse direct current auxiliary power source or by making connections to such separate auxiliary power sources by means of current transformers connected in series with each of the diodes $D_1$ and $D_2$. When coupling to separate auxiliary sources, additional diodes must be connected to block positive current flow from the auxiliary source through the current transformer secondary winding.

It will be apparent that the specific circuit configurations which I have described herein may be changed or varied without departing from the principle of the invention. It is to be understood, therefore, that I intend by the appended claims to cover all such changes and modifications that fall within the true spirit and scope of the invention.

What I claim as new and desire to secure by Letters Patent of the United States is:

1. An inverter circuit comprising a pair of direct current input terminals, a capacitor connected in circuit with said input terminals, a pair of controlled rectifiers connected in series circuit relationship across said input terminals, a load circuit having a resistive portion and an inductive portion, means connecting said input terminals with said controlled rectifiers and said load circuit to provide a current path for energizing said load circuit with half cycles of current flow of opposite direction, said capacitor being charged and discharged during each cycle, a pair of power diodes connected in reverse parallel relationship with said controlled rectifiers, firing circuit means connected in circuit with said controlled rectifiers to provide a pulse of current to alternately trigger one and then the other of said controlled rectifiers, said firing means providing a delayed current pulse to the previously nonconducting controlled rectifier to fire it after a predetermined delay following the cessation of current flow through the other controlled rectifier, said pair of power diodes carrying the main current flow during the commutation of said controlled rectifiers.

2. An inverter circuit as set forth in claim 1 in which said firing circuit means comprises a pair of firing circuit input terminals connected across said load circuit, a first resistor, a nonlinear reactor connected in series circuit relationship with said first resistor, a second resistor, a transformer having a primary and a pair of secondaries, said primary and said second resistor being connected in parallel circuit relationship and said pair of secondary windings being connected in circuit with said controlled rectifiers to alternately trigger said controlled rectifiers.

3. An inverter circuit comprising: a pair of serially connected controlled rectifiers; a pair of power diodes connected in reverse parallel relationship with said controlled rectifiers; a pair of direct current input terminals; a pair of output terminals; a load circuit having a resistance and an inductance connected in circuit with said output terminals; circuit means connecting said input terminals with said controlled rectifiers to provide a current flow in one direction during one half cycle and in an opposite direction during the other half cycle at said output terminals, said capacitor being charged and discharged during each cycle; firing circuit means connected in circuit with said controlled rectifiers to provide a pulse of current to alternately trigger one and then the other of said controlled rectifiers, said firing circuit means providing sufficient time delay to permit one of the controlled rectifiers turned off to return to a blocking state before the other of said controlled rectifiers is fired, said controlled rectifiers providing a path for the main current flow during a portion of each cycle and said power diodes providing a path for the flow of said main current during the commutation period of said controlled rectifiers; and starting means for initially firing one of said controlled rectifiers to start operation of the circuit.

4. An inverter circuit as set forth in claim 3 in which said starting means comprises a switching means, a first resistor connected in series circuit relationship with said switching means, a capacitor, a second resistor connected across said capacitor, said capacitor being connected in series circuit relationship with said resistor and said one of said controlled rectifiers to provide a current pulse to said rectifier when said switching means is actuated to connect said starting means to one of said input terminals.

5. An inverter circuit comprising: a pair of direct current input terminals; a first and a second controlled rectifier, each of said rectifiers having an anode, a cathode and a gate, the anode of one of said controlled rectifiers being connected in circuit with one of said direct current input terminals and the cathode of the other of said controlled rectifiers being connected in circuit with the other of said direct current input terminals; the cathode of said one controlled rectifier being connected in circuit with the anode of said other controlled rectifier; a pair of output terminal connections, said output connections being adapted to provide an alternating current output; at least one capacitor connected in circuit with said output terminal connections; a first power diode connected in reverse parallel relationship across one of said controlled rectifiers; a second power diode connected in reverse parallel relationship across the other of said controlled rectifiers; firing circuit means connected in circuit with said controlled rectifiers to alternately fire said controlled rectifiers, said first and second controlled rectifiers providing paths for the current flow to said output terminal connections during alternate half cycles of said alternating current supply, said first and second power diodes providing paths for the flow of current during the commutation periods of said controlled rectifiers; and means for initially firing one of said controlled rectifiers to start the operation of said inverter circuit.

6. An inverter circuit comprising: a pair of direct current input terminals; a load capacitor; a load circuit having a resistive portion and an inductive portion, said capacitor being connected in series circuit relationship with said load circuit; a pair of controlled rectifiers connected in series circuit relationship; a pair of serially connected power diodes connected across said controlled rectifiers; circuit means connecting said input terminals in circuit with said controlled rectifiers, said power diodes and said load circuit to provide a current path for energizing said load circuit with half cycles of current flow of opposite direction; firing circuit means to provide said controlled rectifiers with a current pulse to alternately fire said controlled rectifiers in order that said controlled rectifiers may provide a path for the current flow to said load circuit, said power diodes providing a path for the flow of current during the commutation period of said controlled rectifiers; and starting means for initially triggering one of the controlled rectifiers to start the operation of the inverter circuit.

7. An inverter circuit comprising a pair of direct current input terminals, a pair of serially connected controlled rectifiers connected across said input terminals, a pair of serially connected power diodes connected across said input terminals and each of said power diodes being connected in reverse parallel relationship across one of said controlled rectifiers, a load circuit including an inductive reactance, a load capacitor connected in series circuit relationship with said load circuit, said capacitor being alternately charged and discharged, a pair of output terminals adapted to provide an alternating current supply when said input terminals are energized by a direct current source, said load circuit being connected across one of said power diodes, firing circuit means connected in circuit with said controlled rectifiers to provide a current pulse to alternately fire one of said controlled rectifiers at the end of a predetermined delay after the other conducting controlled rectifier has been turned off, and starting means for initially firing one of said controlled rectifiers to start operation of the inverter circuit.

8. An inverter circuit comprising: a pair of direct current input terminals; a first and second controlled rectifier connected across said input terminals and serially connected at a first junction; a third and fourth controller rectifier connected across said input terminals and serially connected at a second junction, each of said controlled rectifiers having a power diode connected across it in reverse parallel relationship; a load capacitor and a load circuit having a resistive portion and an inductive portion connected in circuit with said first and second junctions; firing circuit means to provide current pulses to alternately fire a first and a second pair of said controlled rectifiers, the first of said pairs being comprised of said first and fourth controlled rectifiers, and the second of said pairs being comprised of said second and third controlled rectifiers, said pairs of controlled rectifiers providing a current path for energizing said load circuits with half cycles of current flow of opposite direction and said power diodes providing a current path for the main current flow during the commutation period of the controlled rectifiers; and starting means for initially firing one pair of said controlled rectifiers to start operation of the inverter circuit.

9. An inverter circuit comprising: a pair of direct current input terminals; a transformer having a primary, a secondary and a center tap dividing said primary into a first and second primary winding, said center tap being connected in circuit with one of said input terminals; a load capacitor, a load circuit having a resistive portion and an inductive portion being connected in circuit with said secondary winding; a first controlled rectifier being connected in series circuit relationship with said first primary winding; a second controlled rectifier being connected in series circuit relationship with said second primary winding, said controlled rectifiers being connected in circuit with the other of said input terminals; a first power diode connected in reverse parallel relationship across said first controlled rectifier; a second power diode being connected in reverse parallel relationship across said second controlled rectifier; a firing circuit means connected with said controlled rectifiers to provide a delayed current pulse to the previously nonconducting one of said controlled rectifiers to fire it at the end of a predetermined delay after the other controlled rectifier has been turned off in order to provide half cycles of current flow in opposite directions through said load circuit and means for initially firing one of said controlled rectifiers to start the operation of the circuit.

10. An inverter circuit comprising: a pair of direct current input terminals, a pair of controlled rectifiers, a load circuit having a resistive portion and an inductive portion, means connecting said input terminals with said controlled rectifiers and said load circuit to provide a current path for energizing said load circuit with half cycles of current flow of opposite direction, a capacitor connected in circuit with said load circuit, said capacitor being charged and discharged during each cycle, a firing circuit means connected in circuit with said controlled rectifiers to provide a delayed current pulse to the previously nonconducting one of said controlled rectifiers to trigger it at the end of a predetermined delay after the other controlled rectifier has been turned off, a first power diode connected in reverse parallel relationship across one of said controlled rectifiers, a second power diode connected in reverse parallel relationship across the other of said controlled rectifiers, said power diodes providing a path for the flow of current during the commutation period of said controlled rectifiers, means connected in circuit with said power diodes for providing commutation voltage having a predetermined finite value at which voltage level one of said power diodes carries the main current during the commutation period and means for initially firing one of said controlled rectifiers to start the operation of the inverter circuit.

11. An inverter circuit as set forth in claim 10 in which said means for providing a commutation voltage having a predetermined finite value comprises a transformer having a primary, a secondary, a rectifying means and an auxiliary direct current source, said primary being connected in circuit with said controlled rectifiers and said power diodes, said secondary being connected in circuit with said rectifying means and said direct current source, said primary providing a high impedance to the current flow until the voltage across said secondary reaches the voltage level of said auxiliary direct current source.

12. An inverter circuit comprising a pair of direct current input terminals, a pair of capacitors connected across said input terminals, a pair of controlled rectifiers connected in series circuit relationship, a load circuit having a resistive portion and an inductive portion, means connecting said input terminals with said controlled rectifiers and said load circuit to provide a current path for energizing said load circuit with half cycles of current flow of opposite direction, said capacitors being charged and discharged during each cycle, a pair of power diodes connected in reverse parallel relationship with said controlled rectifiers, firing circuit means connected in circuit with said controlled rectifiers to provide a pulse of current to alternately trigger one and then the other of said controlled rectifiers, said firing means providing a delayed current pulse to the previously nonconducting controlled rectifier to fire it after a predetermined delay following the cessation of current flow through the other controlled rectifier, said pair of power diodes carrying the main current flow during the commutation of said controlled rectifiers.

13. An inverter circuit comprising a pair of direct current input terminals, a pair of serially connected controlled rectifiers connected across said input terminals, a pair of serially connected power diodes connected across said input terminals and each of said power diodes being connected in reverse parallel relationship across one of said controlled rectifiers, a load circuit including an inductive reactance, a pair of serially connected capacitors connected across said input terminals, said capacitors being alternately charged and discharged, a pair of output terminals adapted to provide an alternating current supply when said input terminals are energized by a direct current source, said load circuit being connected across one of said power diodes, firing circuit means connected in circuit with said controlled rectifiers to provide a current pulse to alternately fire one of said controlled rectifiers at the end of a predetermined delay after the other conducting controlled rectifier has been turned off, and starting means for initially firing one of said controlled rectifiers to start operation of the inverter circuit.

References Cited in the file of this patent

UNITED STATES PATENTS

| | | |
|---|---|---|
| 1,834,889 | Bedford | Dec. 1, 1931 |
| 1,929,720 | Willis | Oct. 10, 1933 |
| 1,967,876 | Fecker | July 24, 1934 |
| 1,988,947 | Hintze | Jan. 22, 1935 |
| 2,220,077 | Coffin | Nov. 5, 1935 |
| 2,233,416 | Klemperer | Mar. 4, 1941 |
| 2,475,621 | Klemperer | July 12, 1949 |
| 2,486,176 | Klemperer | Oct. 25, 1949 |
| 2,523,094 | Carleton | Sept. 19, 1950 |
| 2,563,486 | Potter | Apr. 7, 1951 |
| 2,628,340 | Potter | Feb. 10, 1953 |
| 2,850,832 | Kreutzer | Sept. 9, 1958 |